W. A. ROCKWELL.
SEED PLANTER.
APPLICATION FILED APR. 15, 1908.

912,891.

Patented Feb. 16, 1909.
3 SHEETS—SHEET 1.

WITNESSES
J. H. Schmidt.
Amos W Hart

INVENTOR
WARREN A. ROCKWELL,
BY Munn & Co.
ATTORNEYS

W. A. ROCKWELL.
SEED PLANTER.
APPLICATION FILED APR. 15, 1908.
912,891.
Patented Feb. 16, 1909.
3 SHEETS—SHEET 2.
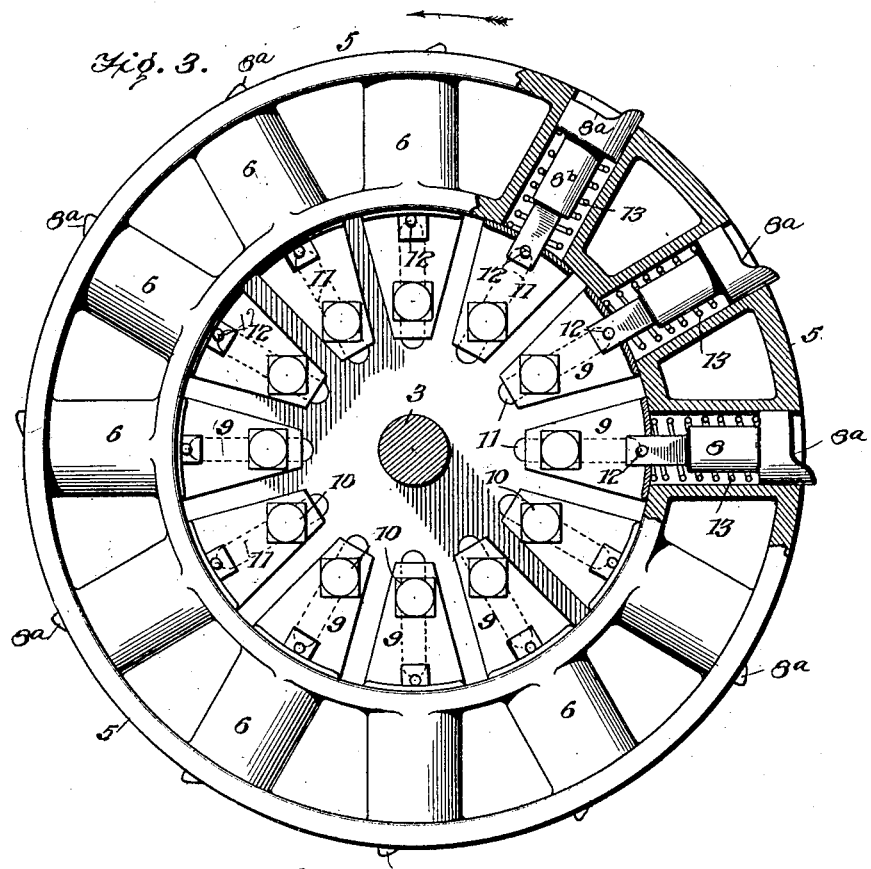
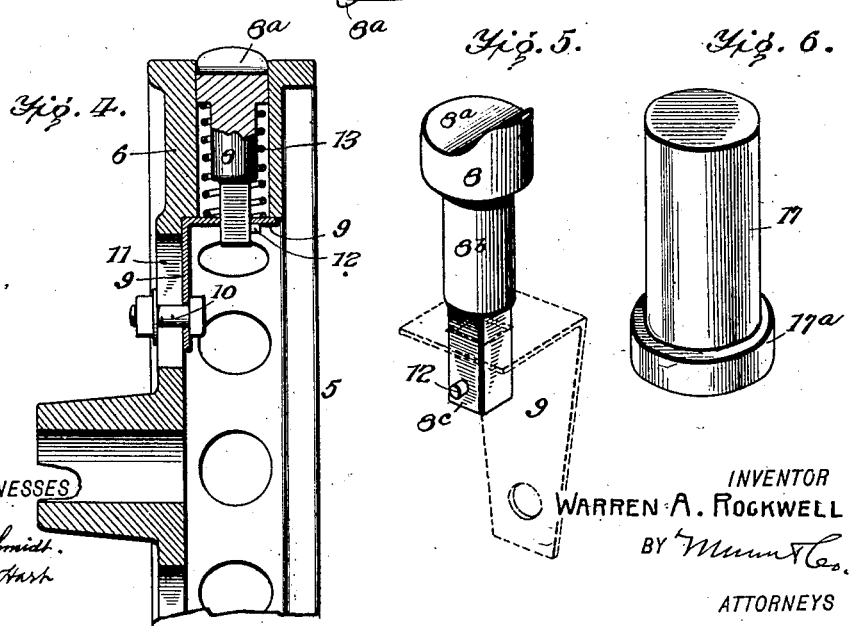
INVENTOR
WARREN A. ROCKWELL,
ATTORNEYS

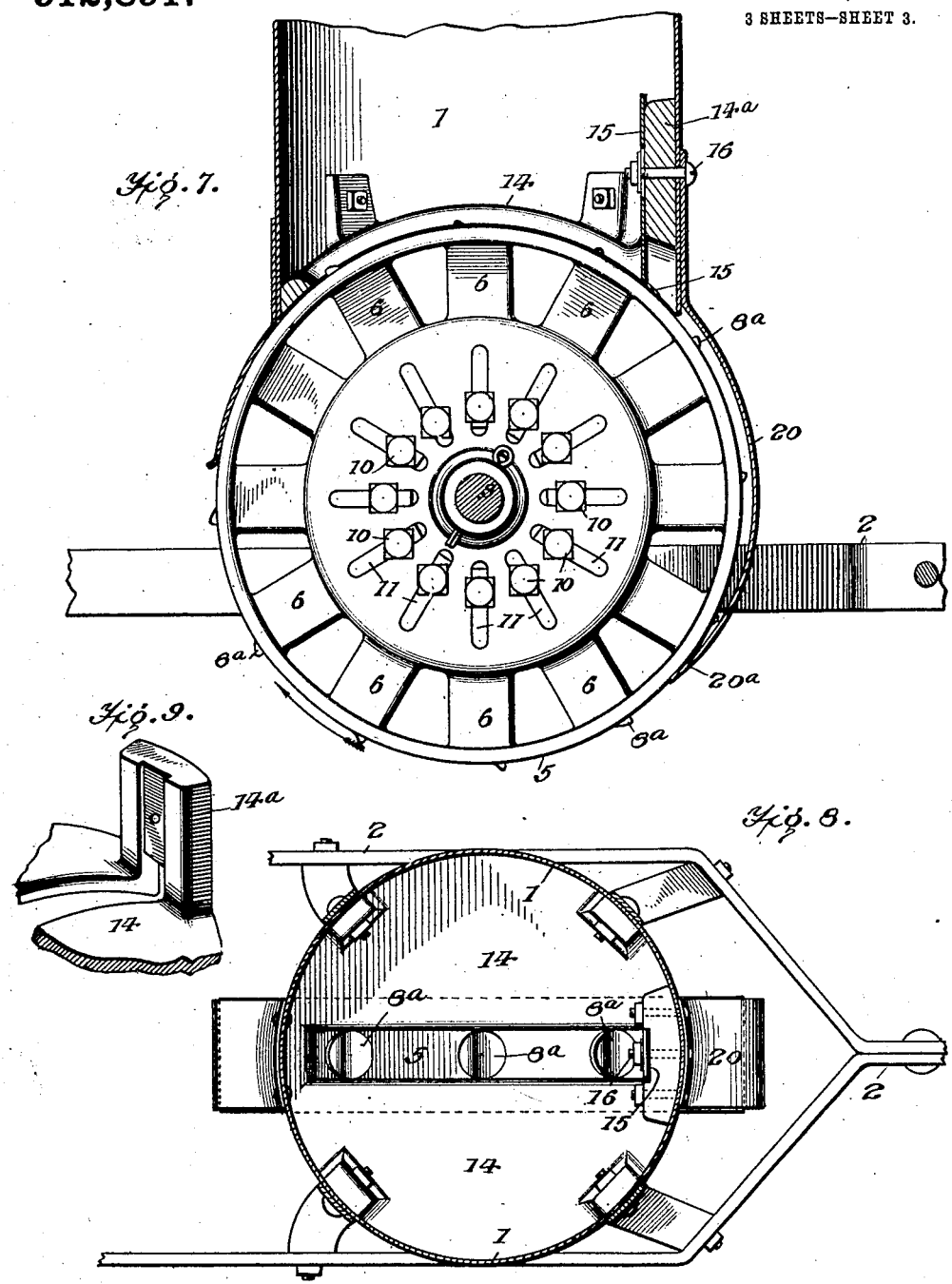

UNITED STATES PATENT OFFICE.

WARREN AYRES ROCKWELL, OF HARRIMAN, TENNESSEE.

SEED-PLANTER.

No. 912,891.　　　　　　Specification of Letters Patent.　　　　　Patented Feb. 16, 1909.

Application filed April 15, 1908. Serial No. 427,190.

*To all whom it may concern:*

Be it known that I, WARREN AYRES ROCKWELL, a citizen of the United States, residing at Harriman, Roane county, State of Tennessee, have invented an Improvement in Seed-Planters, of which the following is a specification.

My invention is an improvement upon the planter for which Letters Patent No. 847,901 were granted to Messrs. Caldwell and Rockwell, March 19, 1907.

My improvement pertains to the plunger attachment of the rotatable seed wheel, also to means for governing the discharge of seed from the hopper and the wheel.

The details of construction, arrangement, and combination of parts embodying my invention, are as hereinafter described and illustrated in the accompanying drawings in which—

Figure 1:
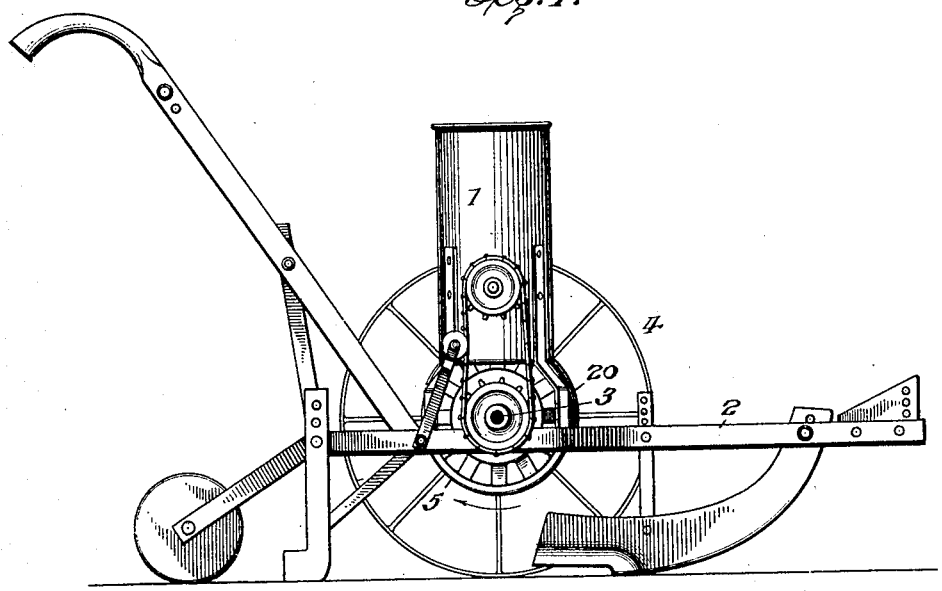
Figure 2:
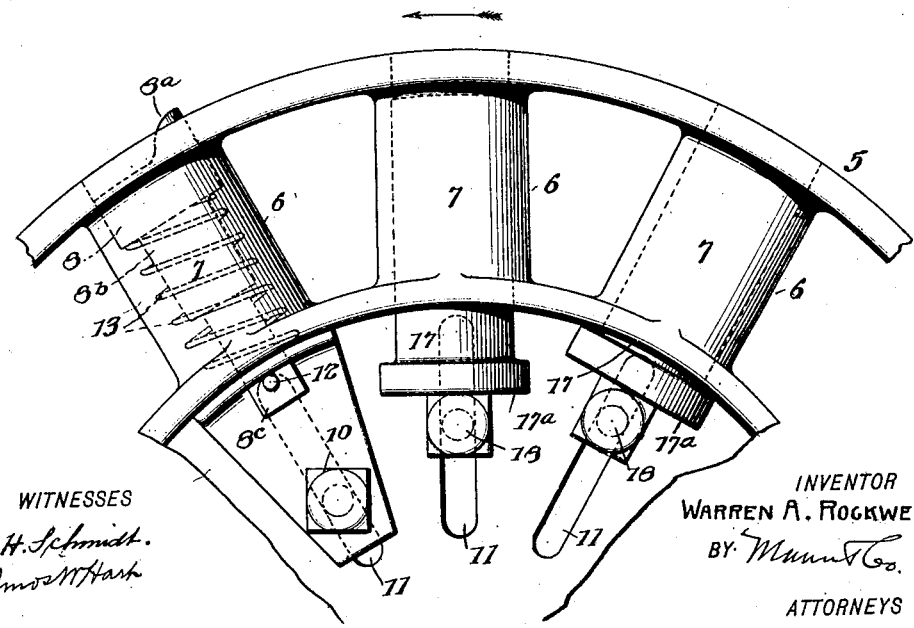

Figure 1 is a side view of my improved planter, save that one of the ground or running wheels has been removed and the axle shown in section. Fig. 2 is a side elevation or a section of the seed wheel. Fig. 3 is in part a side view, and in part a section, of the complete seed-wheel. Fig. 4 is a transverse section of a portion of the seed-wheel showing the arrangement of the spring plunger employed in dropping corn, peas, beans, and other analogous seeds. Fig. 5 is a perspective view of the spring plunger. Fig. 6 is a perspective view of a form of plunger which may be used in dropping cotton seed. Fig. 7 is a vertical section of a portion of the seed-hopper with the seed-wheel shown in face view. Fig. 8 is a horizontal section of the hopper with other parts shown in plan view. Fig. 9 is a perspective view of the portion of the bottom of the hopper for holding a spring controlling the discharge of seed.

As shown in Fig. 1, a seed-hopper 1 is supported upon a horizontal frame 2 having bearings for an axle, or shaft, 3, upon which large running wheels are mounted fast. As the machine is drawn forward, the wheels 4 rotate the shaft 3, and, through sprocket wheels and chain, rotation is imparted to an agitator (not shown), arranged in the hopper. The seed-wheel 5 is also rotated in the direction of the arrow in Fig. 1, by reason of it being fast on the axle or shaft 3. Different sizes of wheels 4 may be employed in order to vary the spaces between hills as required.

The seed-wheel is constructed, as shown in several figures, with a series of radial guides 6 and 7 for plungers 8 and 9 (see Figs. 5 and 6). The plunger 8 has a recessed head $8^a$, and a reduced body $8^b$, and a square shank $8^c$. As shown in Fig. 4, this shank passes through a similarly shaped opening in a right angular plate or bracket 9, which is adjusted radially in the wheel, being for this purpose attached to a screw-bolt 10, which is adapted to slide, for adjustment, in a radial slot 11 formed in the body of the wheel. A cotter-pin 12 passes through the inner end of the shank $8^c$, and a spiral spring 13 surrounds the body of the plunger, it being arranged within the socket or cylindrical guide 6, and between the head $8^a$ of the plunger and the bracket 9. It is apparent that the tension of the spring 13 will hold the plunger in such position that the pin 12 will be normally in contact with the inner side of the bracket 9, but that upon pressure being applied to the outer end of the plunger, the spring will yield correspondingly.

By means of the screw-bolt 10, the bracket 9 may be set to hold the plunger with its head slightly below, or projecting from, the periphery of the seed-wheel. Normally, the head $8^a$ projects on one side, as shown in Figs. 3 and 4. This plunger 8 is particularly adapted for use in dropping and planting corn, peas, beans, and other analogous seeds. Such seeds being placed in the hopper 1, as the machine advances, the seed-wheel is rotated, and the seeds fill the recesses in the heads of the spring plungers. If a cylindrical plunger were used, that is to say, a plunger such as is represented in Fig. 6, openings in the periphery of the seed-wheel would be so large that more grains of corn, or peas, or beans, would enter than is desirable to plant in a single hill. The projection or lip at one side of the head of the spring plunger allows the surplus grains of corn, peas or beans that accumulate in the cup or recess to slide off free from the cup without breaking or crushing, when the plunger passes beneath the forward end of the bottom 14 of the hopper (see Fig. 7). The said bottom is provided with a transverse slot through which the seed-wheel is visible, as shown in Fig. 8, and on its forward side, it has a vertical lug $14^a$ (see Figs. 7 and 9), which is grooved on the inner side to receive and support a plate-spring 15. Such spring is secured adjustably by a screw-bolt 16, the spring having a slot for this purpose.

The lower end of the spring is bent at an obtuse angle, and presses lightly upon the periphery of the seed-wheel. As the latter rotates, the spring plungers 8 are brought successively under this end of the spring, and the same depresses or pushes inward the plungers by contact with the projecting lip, thus temporarily increasing the size of the pocket for reception of the seed. In other words, the spring allows the head of the plunger to yield to pressure at the time it is about to pass beyond the hopper, and the sloping or beveled lip of the plungers enables them to pass easily under the spring and at the same time allows a sufficient quantity or number of corn or pea seed to be carried out of the hopper without being cracked or broken by being brought into contact with the unyielding forward edge of the hopper bottom, as would be the case if the plunger were rigid instead of yielding. It is obvious, that by the adjustment of the bracket 9, the plunger 8 may be set with its lip projecting more or less from the periphery of the seed-wheel proper, and that the spring allows it to yield readily to the pressure of the plate or spring 15. The spring 15 also yields more or less and thus contributes to the desired result, namely, avoidance of injury to the seed by cracking it or breaking it by too severe pressure. It is of course to be understood that the heads of the plungers 8 may be made of different depths or shapes to accommodate various kinds of seeds, since their use is not limited to corn or peas, but available for planting oats in drills, also for planting sorghum, cane-seed, beans, etc.

Cotton-seed being covered with lint is softer and more flexible than corn, peas, beans, etc., and hence is not so easily cracked and broken as harder grains; therefore, there is no necessity for a yielding plunger when the cotton-seed pass beneath the rigid forward end of the slotted bottom of the hopper. For cotton-seed, therefore, a cylindrical plunger 17 may be employed, the same having a collar 17$^a$ on its inner end as shown in Figs. 2 and 6. A screw-bolt 18—see Fig. 2—limits the radial play of this plunger. In case it is desired to plant cotton, and all the plungers are not used at the same time, it is apparent that cylindrical and spring plungers may both be used in the wheel at the same time, since the cylindrical plungers may be set to close the openings in the periphery of the seed-wheel.

Referring particularly to Figs. 1, and 7, it will be seen that there is on the front of the seed wheel, a curved metal plate 20, which is secured to the front lower portion of the hopper 1, and is out of contact with the periphery of the seed-wheel, save at its lower end 20$^a$. This plate is constructed of sheet steel and is therefore adapted to yield. Its function is to serve as a guard or shield to prevent cotton-seed from falling to the ground from the seed-wheel prematurely, or before the plungers act. It is separated from the seed-wheel far enough to allow the cotton-seed to be rolled between the face of the wheel and the inner face of the shield, whereby the cotton seeds are separated somewhat from each other in place of falling in a compact mass or lump as they would otherwise tend to do by reason of the adherence due to the lint that the seeds are normally covered with. The body of the spring shield 20 will ordinarily be set from one-eighth to a quarter of an inch away from the seed-wheel, this space being sufficient to permit the cotton seeds to be rolled along until they drop off at the end of the shield. The number of cotton seed to the hill will usually be from three to six or seven.

What I claim is:

1. In a planter of the type indicated, the combination, with a seed-hopper, a seed-wheel having radial slots in its web or body, and means for rotating said wheel, of plungers which are slidable radially in the periphery of the wheel, radially adjustable right-angular brackets in which the plungers are held and guided in their sliding movement, a spring encircling the body of each plunger and interposed between the head thereof and a bracket, and screw-bolts passing through the wheel slots and serving to secure the brackets in any required radial adjustment.

2. The combination with a seed hopper, a seed-wheel, and means for rotating it, of radially slidable spring-supported plungers having a lip or flange projecting at the rear side of their heads, substantially as described.

3. The combination with a seed-hopper and a spring seed-detainer arranged therein, of a rotatable seed-wheel arranged beneath the hopper and having a series of radially slidable spring-supported plungers having a lip or flange at the rear side of their heads which are adapted for contact with the aforesaid detainer, substantially as described.

4. The combination, with the hopper bottom having a transverse slot and a vertical lug arranged at the outer end of such slot and provided with a vertical groove on its inner side, of the seed-detainer 15, consisting of a plate-spring whose shank is secured in the groove of the aforesaid lug and whose lower end is bent outward at an obtuse angle and bears lightly upon the periphery of the seed-wheel, as shown and described.

WARREN AYRES ROCKWELL.

Witnesses:
J. F. CORMANY,
REUBEN HURTT.